United States Patent
Amiss

(10) Patent No.: US 9,574,922 B2
(45) Date of Patent: Feb. 21, 2017

(54) METHOD AND APPARATUS FOR METERING OF LOOSE OBJECTS, SUCH AS GRANULAR OBJECTS, POWDERS, OR CAPSULES

(71) Applicant: Hauni Maschinenbau GmbH, Hamburg (DE)

(72) Inventor: Robert Amiss, Lanexa, VA (US)

(73) Assignee: Hauni Maschinenbau GmbH, Hamburg (DE)

( * ) Notice: Subject to any disclaimer, the term of this patent is extended or adjusted under 35 U.S.C. 154(b) by 53 days.

(21) Appl. No.: 14/202,455

(22) Filed: Mar. 10, 2014

(65) Prior Publication Data
US 2014/0263408 A1    Sep. 18, 2014

Related U.S. Application Data

(60) Provisional application No. 61/962,287, filed on Mar. 15, 2013.

(51) Int. Cl.
*B65B 1/30* (2006.01)
*G01F 11/46* (2006.01)
(Continued)

(52) U.S. Cl.
CPC ............ *G01F 11/46* (2013.01); *A24D 3/0216* (2013.01); *A24D 3/0225* (2013.01); *B65B 1/06* (2013.01);
(Continued)

(58) Field of Classification Search
CPC .... A24D 3/0216; A24D 3/061; A24D 3/0225; B65B 1/363; B65B 1/06; B65B 1/14; B65B 37/20; B65B 25/00; G01F 11/46; B67C 3/204
(Continued)

(56) References Cited

U.S. PATENT DOCUMENTS 888,464 A  *  5/1908  Burri .................... B01F 13/1055
                                                        141/104
2,600,391 A  *  6/1952  Cabot .................... B65B 31/025
                                                        141/147
(Continued)

FOREIGN PATENT DOCUMENTS

CH          695 306 A5      3/2006
DE       10 80 469 B        4/1960
(Continued)

OTHER PUBLICATIONS

Extended European Search Report issued Sep. 24, 2014 in European Patent Application No. 14159396.2.
(Continued)

*Primary Examiner* — Paul R Durand
*Assistant Examiner* — Charles P Cheyney
(74) *Attorney, Agent, or Firm* — Venable LLP; Steven J. Schwarz

(57) ABSTRACT

A volumetric metering device includes a hopper adapted to hold a supply of granular material, the hopper having an outlet; a rotating wheel located in communication with the outlet, the rotating wheel having an outer periphery and a plurality of metering cavities distributed around the outer periphery, each metering cavity having an open bottom portion; and a plurality of metering valves located around the outer periphery of the rotating wheel with each metering valve located in registry with one of the metering cavities. Each metering valve is movable between a loading position wherein the metering valve blocks the open bottom portion of the metering cavity, and an unloading position wherein the granular material dispenses from the metering cavity through the metering valve. Other features and related methods are also described.

13 Claims, 9 Drawing Sheets

(51) Int. Cl.
*A24D 3/02* (2006.01)
*B65B 37/20* (2006.01)
*B65B 1/36* (2006.01)
*B65B 25/00* (2006.01)
*B65B 1/06* (2006.01)
*B65B 1/14* (2006.01)

(52) U.S. Cl.
CPC ............... *B65B 1/14* (2013.01); *B65B 1/363* (2013.01); *B65B 25/00* (2013.01); *B65B 37/20* (2013.01)

(58) Field of Classification Search
USPC ............... 222/427, 636, 370, 168.5, 144, 144.5, 222/365–368, 56
See application file for complete search history.

(56) References Cited

U.S. PATENT DOCUMENTS

| | | | | |
|---|---|---|---|---|
| 2,794,578 | A * | 6/1957 | Saxe | 222/240 |
| 3,477,617 | A * | 11/1969 | Techtmann | 222/370 |
| 3,580,302 | A * | 5/1971 | Riesenberg | B67C 3/206 141/141 |
| 3,850,345 | A * | 11/1974 | Merritt | B65B 3/323 141/146 |
| 4,407,436 | A * | 10/1983 | Broadfoot et al. | 222/636 |
| 4,582,225 | A * | 4/1986 | Peden | A61C 19/00 211/163 |
| 4,754,785 | A * | 7/1988 | Eisenberg | 141/1 |
| 5,058,634 | A * | 10/1991 | Tisma | B65B 1/36 141/129 |
| 5,082,032 | A * | 1/1992 | Crocker | 141/1 |
| 5,875,824 | A | 3/1999 | Atwell et al. | |
| 8,157,129 | B2 * | 4/2012 | Kawanishi | G01F 11/18 222/168.5 |
| 8,303,474 | B2 * | 11/2012 | Iliev | A24D 3/061 493/47 |
| 2001/0041117 | A1 * | 11/2001 | Comardo | 414/160 |
| 2007/0284012 | A1 * | 12/2007 | Smith et al. | 141/1 |
| 2007/0295755 | A1 * | 12/2007 | Kinzie et al. | 222/239 |
| 2009/0166376 | A1 * | 7/2009 | Garthaffner et al. | 221/282 |
| 2013/0266406 | A1 * | 10/2013 | Le Roux | 414/225.01 |

FOREIGN PATENT DOCUMENTS

| | | |
|---|---|---|
| DE | 10 2011 076783 B3 | 8/2012 |
| EP | 0 257 230 A2 | 3/1988 |
| EP | 1 228 709 A1 | 8/2002 |
| GB | 1 212 963 A | 11/1970 |
| WO | WO-2005/102080 A1 | 11/2005 |
| WO | WO-2009/016512 A2 | 2/2009 |
| WO | WO-2009/071272 A1 | 6/2009 |
| WO | WO-2011/045066 A1 | 4/2011 |
| WO | WO 2012072676 A1 * | 6/2012 |

OTHER PUBLICATIONS

Extended European Search Report issued Aug. 7, 2014 in European Patent Application No. 14159398.8.

* cited by examiner

METHOD AND APPARATUS FOR METERING OF LOOSE OBJECTS, SUCH AS GRANULAR OBJECTS, POWDERS, OR CAPSULES

CROSS-REFERENCE TO RELATED APPLICATIONS

This application claims priority to U.S. Provisional Application No. 61/962,287, filed on Mar. 15, 2013, the entire content of which is incorporated herein by reference.

TECHNICAL FIELD

This patent application relates generally to apparatuses and methods for metering objects. More specifically, this patent application relates to methods and apparatuses for metering loose objects for use in making smoking articles, such as cigarettes.

BACKGROUND

Conventional smoking articles, such as cigarettes, typically include a tobacco rod, a filter, and a layer or layers of paper surrounding the tobacco rod and filter. However, the design of cigarettes has evolved to include other components or segments, such as solid heat sources, flavor pellets, flavor capsules, and/or other items. Some of these components may be small in size, difficult to manipulate, and/or difficult to combine. Accordingly, the demands on cigarette manufacturing techniques and related equipment have increased as a result of the evolution in cigarette design.

SUMMARY

According to an embodiment, the present application provides a volumetric metering device comprising: a hopper adapted to hold a supply of granular material, the hopper having an outlet; a rotating wheel located in communication with the outlet, the rotating wheel having an outer periphery and a plurality of metering cavities distributed around the outer periphery, each metering cavity having an open bottom portion; and a plurality of metering valves located around the outer periphery of the rotating wheel with each metering valve located in registry with one of the metering cavities; wherein each metering valve is movable between a loading position wherein the metering valve blocks the open bottom portion of the metering cavity, and an unloading position wherein the granular material dispenses from the metering cavity through the metering valve.

According to another embodiment, the present application provides a method for metering a predetermined volume of granular material, the method comprising: (a) unloading granular material from a hopper onto a rotating wheel; (b) distributing the granular material into a metering cavity located at a periphery of the rotating wheel, the metering cavity having an open bottom portion; and (c) moving a metering valve located in registry with the metering cavity from a loading position where the metering valve blocks the open bottom portion of the metering cavity, to an unloading position where the granular material dispenses from the metering cavity through the metering valve.

BRIEF DESCRIPTION OF THE DRAWINGS

The foregoing aspects and other features and advantages of the invention will be apparent from the following drawings, wherein like reference numbers generally indicate identical, functionally similar, and/or structurally similar elements.

DETAILED DESCRIPTION

Embodiments of the invention are discussed in detail below. In describing embodiments, specific terminology is employed for the sake of clarity. However, the invention is not intended to be limited to the specific terminology so selected. A person skilled in the relevant art will recognize that other equivalent parts can be employed and other methods developed without departing from the spirit and scope of the invention. All references cited herein are incorporated by reference as if each had been individually incorporated.

According to embodiments, this application relates to methods and apparatuses for making tobacco products, such as smoking articles (e.g., cigarettes, cigars, or the like), having a predetermined volume of loose objects in addition to loose tobacco and a filter.

For ease of discussion, and without limitation, the methods and apparatuses will be described herein with respect to making "cigarettes." However, as mentioned above, the present application is not exclusive to cigarette manufacturing, but could be used with any type of tobacco product or smoking article, or moreover, to other non-tobacco related products such as pill capsules.

The term loose or granular material is used herein to describe various components of cigarettes, such as charcoal, fibers, fiber mixtures, tobacco pellets, flavor capsules, or flavor impregnated granulates. However, the term is not limited to the described embodiments. Rather, the term granular material refers generally to any material that is made up of small grains, particles, beads, or the like, such as pellets, powders, and capsules, whether regular or irregular in size and/or shape.

Figure 1:
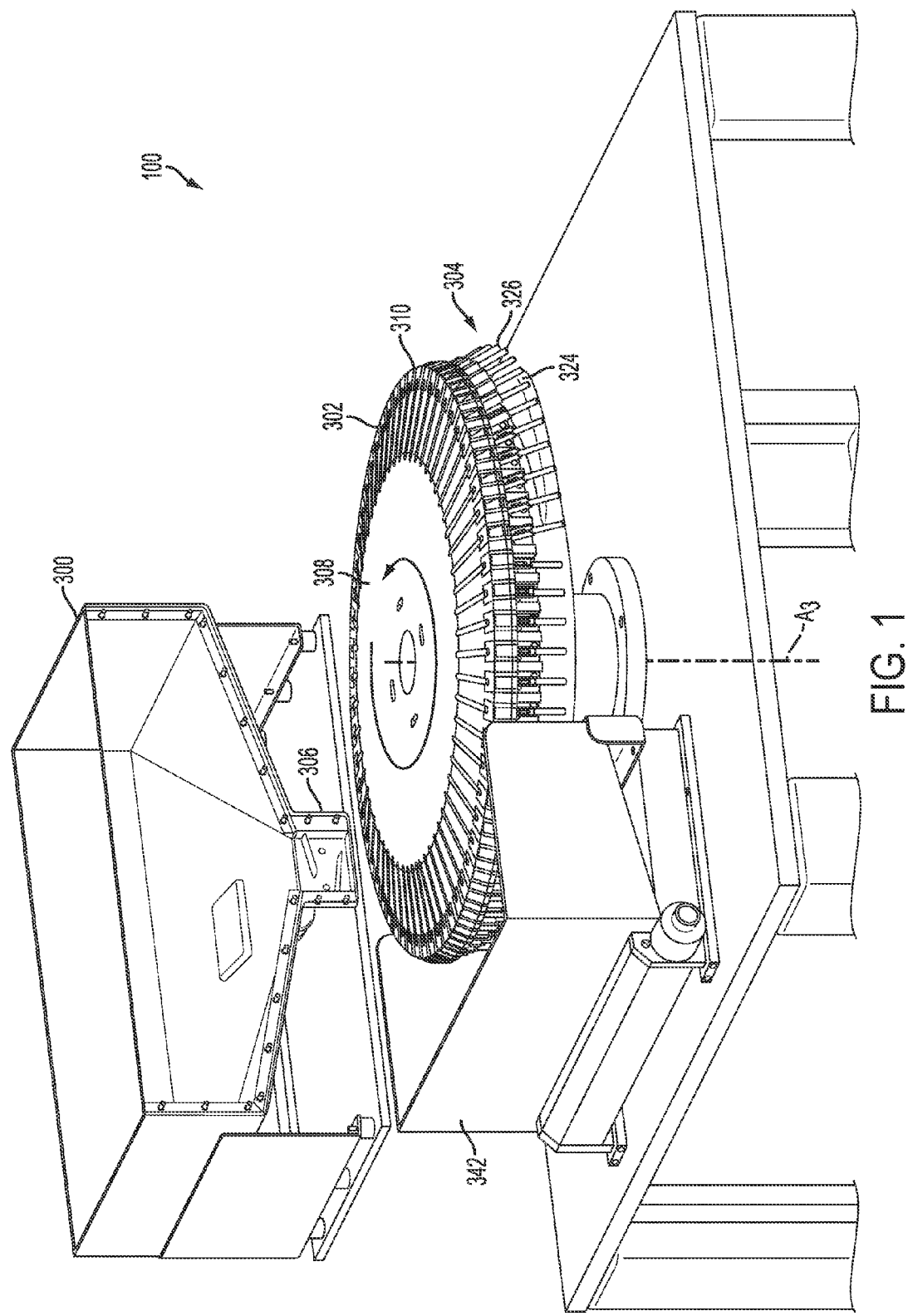
FIG. 1 is a perspective view of an embodiment of a volumetric metering device.

FIGS. 1-4 depict an embodiment of a volumetric metering device 100. Referring to FIG. 1, the volumetric metering device 100 can generally include a hopper 300 that houses granular material, and a rotating wheel 302 that receives the granular material from the hopper 300 and meters/dispenses the granular material through a plurality of metering valves 304 distributed around the rotating wheel 302. The rotating wheel 302 can rotate about axis A3, for example, under the power of an electric motor or other power source known in the art.

Still referring to FIG. 1, the hopper 300 can comprise any hopper known in the art that is suitable for holding granular material. The hopper 300 can include an outlet 306 that dispenses the granular material, for example, under the force of gravity. According to embodiments, the outlet 306 can include one or more adjustment mechanisms, not shown, to adjust the flow rate of granular material exiting the outlet 306. For example, the flow of granular material through outlet 306 can be varied to correspond to the rate at which the granular material is dispensed from rotating wheel 302.

As shown in FIG. 1, the rotating wheel 302 can be located underneath the outlet 306 of the hopper, such that granular material exiting the outlet 306 is deposited on the upper surface 308 of the rotating wheel 302. The upper surface 308 can slope downward from the center of the rotating wheel 302 toward the outer periphery 310 of the rotating wheel 302. This can help promote distribution of the granular material deposited from the hopper outlet 306 to the metering valves 304 located at the outer periphery 310 of the rotating wheel 302, for example, under gravitational and/or centrifugal forces.

Figure 2:
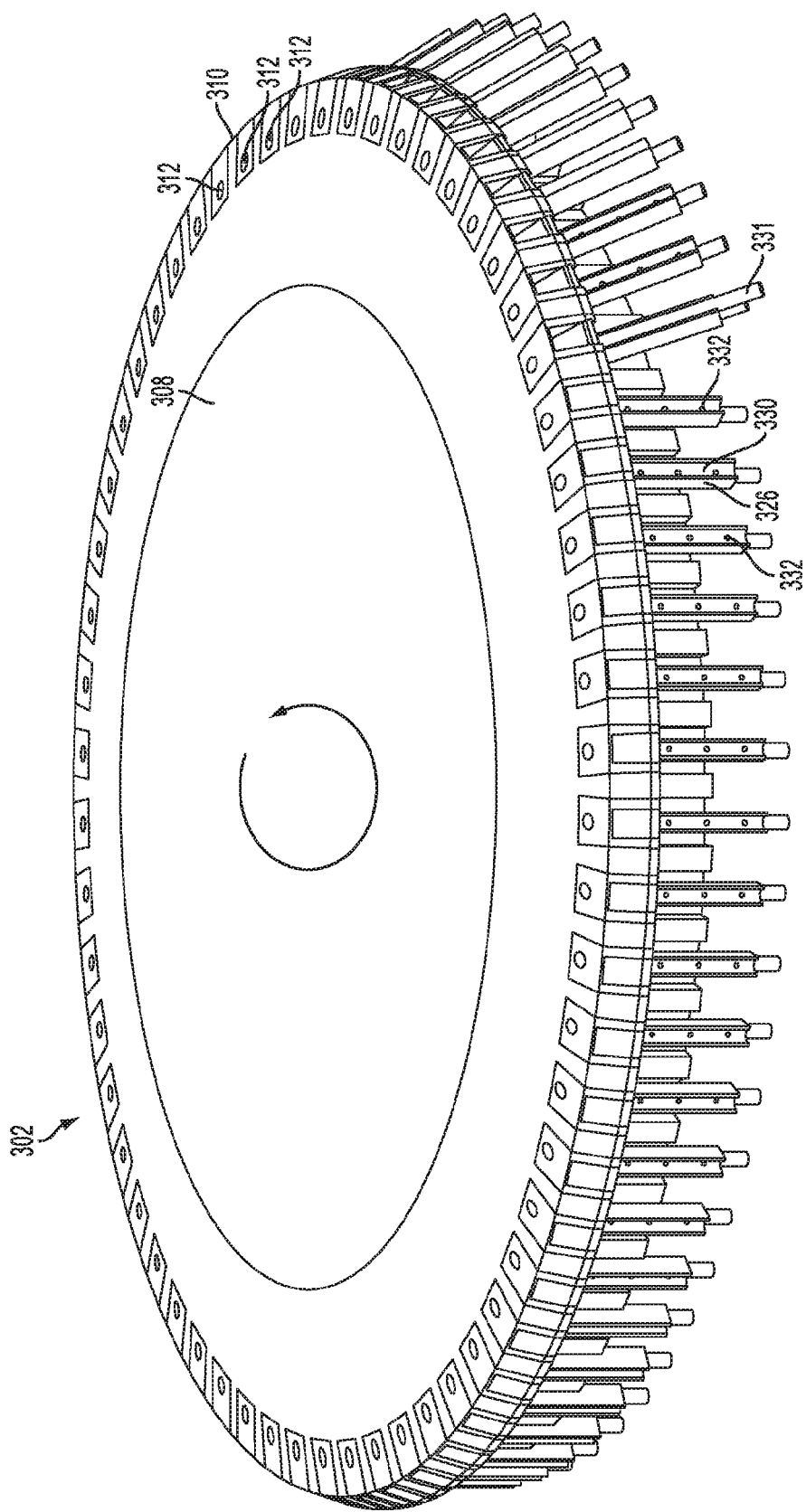
FIG. 2 is a perspective view of an embodiment of a rotating wheel or platter of the volumetric metering device of FIG. 1.

Referring to FIG. 2, the rotating wheel 302 is shown in more detail. As shown, a plurality of metering cavities 312 can be distributed around the periphery of the rotating wheel 302, e.g., equidistantly. Each metering cavity 312 can define an open top that is coextensive with the upper surface 308 of the rotating wheel 302, such that granular material sliding down the upper surface 308 toward the outer periphery 310 (e.g., under gravitational and/or centrifugal forces) falls into the metering cavity as it passes over the open top. As shown, the metering cavities 312 and dispensers 304 can be located in registry with one another about the periphery 310 of rotating wheel 302. According to an embodiment, guides, such as upright fins or dividers, can be located between adjacent metering cavities 312, or groups of metering cavities 312, to help direct granular material into the metering cavities 312.

Figure 3:
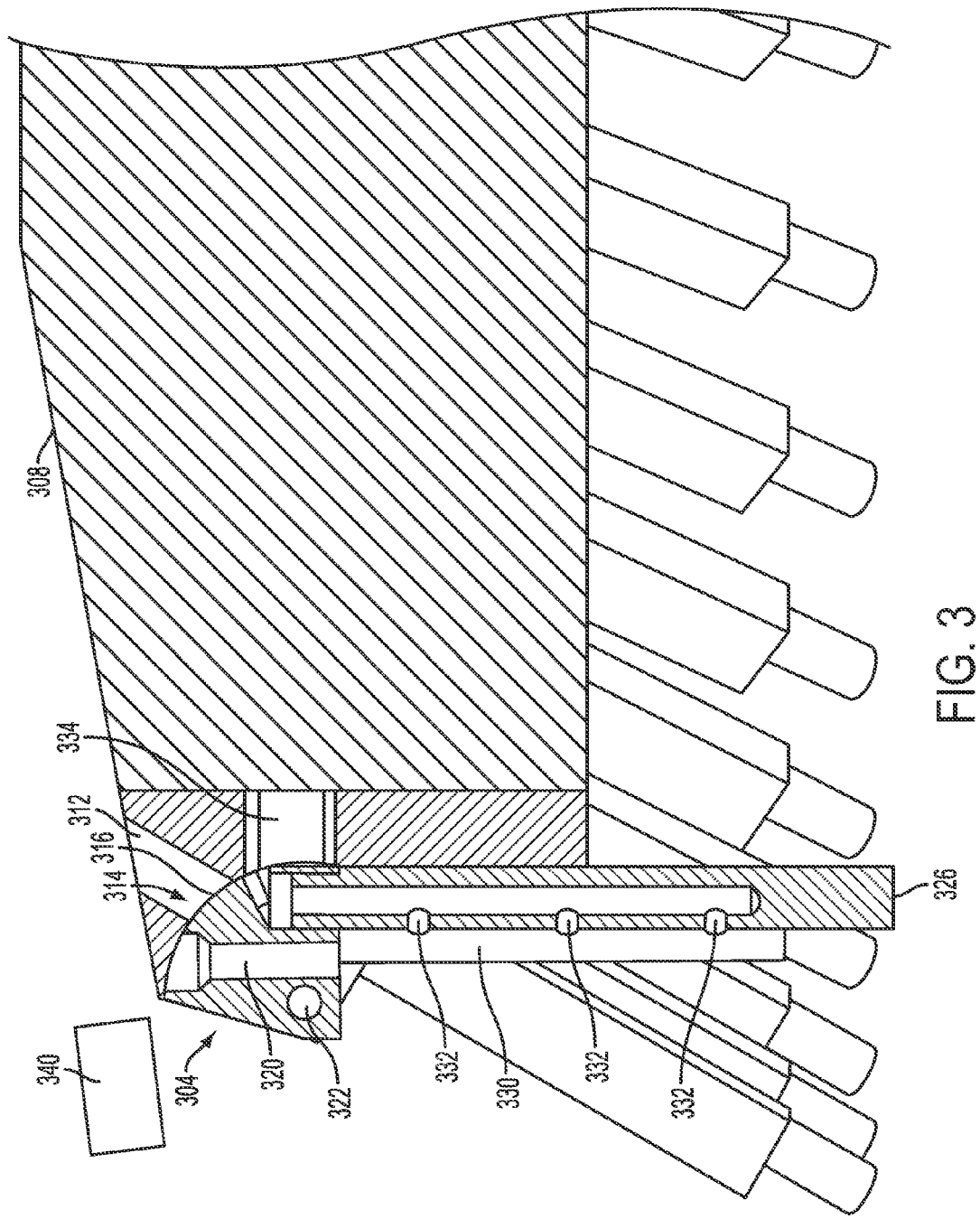
FIG. 3 is a side, cross-sectional view of a portion of the rotating wheel of FIG. 1, shown with an embodiment of a dispenser in a loading position.

As shown in FIG. 3, each metering cavity 312 can define an open bottom portion 314 through which the granular material can pass, e.g., under gravitational force, unless there is a structure there to block it. In this regard, the metering valves 304 can include a valve body 316, which when located in registry with the open bottom portion 314, blocks movement of the granular material through the open bottom portion 314. Thus, according to embodiments, the metering cavity 312 in combination with the valve body 316 can define a predetermined volume of granular material when the granular material is leveled off evenly with the upper surface 308 of the rotating wheel 302. This predetermined volume can correspond to the desired volume of granular material to be metered by the volumetric metering device 100.

According to an embodiment, a leveling device 340 (shown schematically in FIGS. 3 and 4) can remove excess granular material extending from the metering cavities 312 above the upper surface 308 of the rotating wheel 302. The leveling device 340 can comprise a brush, a blade, air knife or other device located at selected radial locations with respect to the rotating wheel 302, and physically displaces granular material extending above the upper surface of the wheel, for example, by scraping or blowing. According to an embodiment, an overflow collector 342 can be located in the proximity of the leveling device 340 to collect excess granular material removed from the rotating wheel 302. The excess granular material can then be reintroduced into the hopper 300 for reuse, or otherwise recycled.

Figure 4:
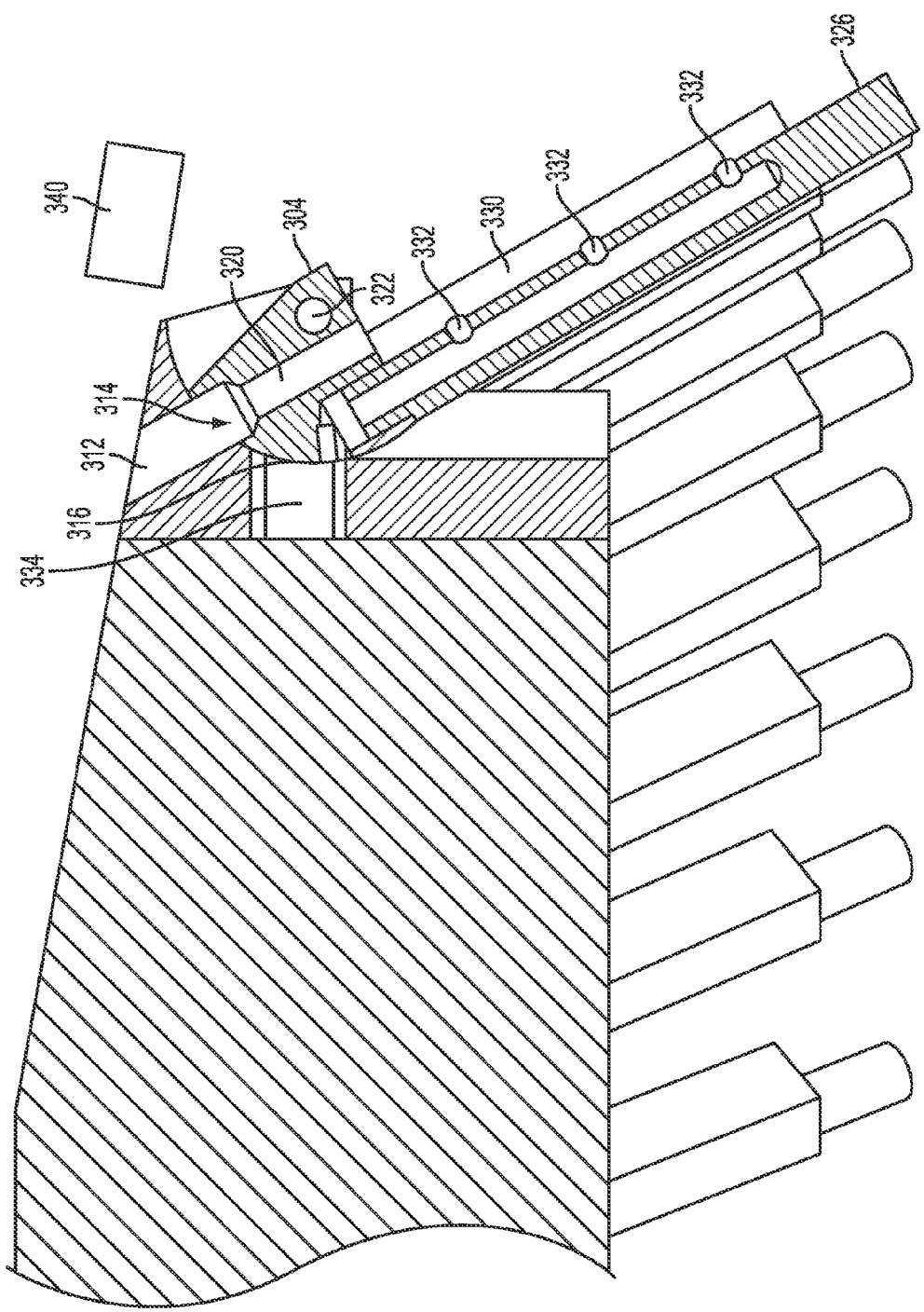
FIG. 4 is a side, cross-sectional view of a portion of the rotating wheel of FIG. 3, shown with an embodiment of a dispenser in an unloading position.

As shown in FIG. 4, each valve body 316 can include a valve opening 320 that can be moved into registry with the open bottom portion 314 of the metering cavity 312 to allow the granular material to exit the metering cavity 312 through the open bottom portion 314 and valve opening 320. The metering valves 304 can move, e.g., pivot, between a loading position shown in FIG. 3, where the valve body 316 is covering the open bottom portion 314 of the metering cavity 312, and a unloading position shown in FIG. 4, where the valve opening 320 unloading portion is in registry with the open bottom portion 314 to dispense the granular material located in the metering cavity 312. As shown in FIGS. 3 and 4, the metering valves 304 can pivot with respect to the rotating wheel 302 via hinge pins 322, however, other configurations are possible as will be apparent to those of ordinary skill in the art based on this disclosure.

Referring back to FIG. 1, a cam mechanism can control pivoting of the metering valves 304 between the loading position (FIG. 3) and the unloading position (FIG. 4). More specifically, a cam surface 324 can be associated with the rotating wheel 302, e.g., located on a stationary object near the rotating wheel 302. Each metering valve 304 can include a flute 326 that acts as a cam follower by interacting with the cam surface 324 to pivot the metering valve 304 from the loading position to the unloading position, and vice versa. According to an embodiment, the cam surface 324/flute 326 can move the metering valves 304 into the loading position before they pass under the outlet 306 of the hopper 300 (e.g., allowing the metering cavities 312 to fill up with, and store, the granular material). The cam surface 324/flute 326 can subsequently move the metering valves 304 into the unloading position to dispense the granular material in the metering cavities 312. Next, the cam surface 324/flute 326 can move the metering valves 304 back into the loading position prior to once again passing under the outlet 306 of the hopper 300.

Referring to FIGS. 2-4 in combination, each flute 326 can include a channel-like portion 330 shaped to laterally receive a substantially cylindrical rod, such as a tube 331. According to an embodiment, the channel-like portion 330 can support the tube with an open portion in registry with the valve opening 320 of the metering valves, such that granular material dispensed through the valve opening 320 (e.g., when in the unloading position) passes through the valve opening 320 into the open portion of the tube.

Vacuum holes 332 can be located in the channel-like portion 330, and can be connected to an upstream vacuum source, for example, through conduit 334. The vacuum source can be used to apply vacuum to the vacuum holes 332, for example, to help retain a tube on the flute 326. Alternatively, the vacuum source can apply pressure to the vacuum holes 332, for example, to help displace the tube from the flute 326 during transfer to downstream processing apparatuses. According to embodiments, a drum (not shown) can transfer the tubes to the flutes 326, where they are filled with the granular material, and after filling, the tubes can be transferred back to the drum. According to an alternative embodiment, the valve openings 320 can dispense the granular material into the tubes while still on the drum, for example, when a valve opening 320 rotates into registry with a tube on the drum. Other embodiments are possible as will be appreciated based on this disclosure.

Figure 5:
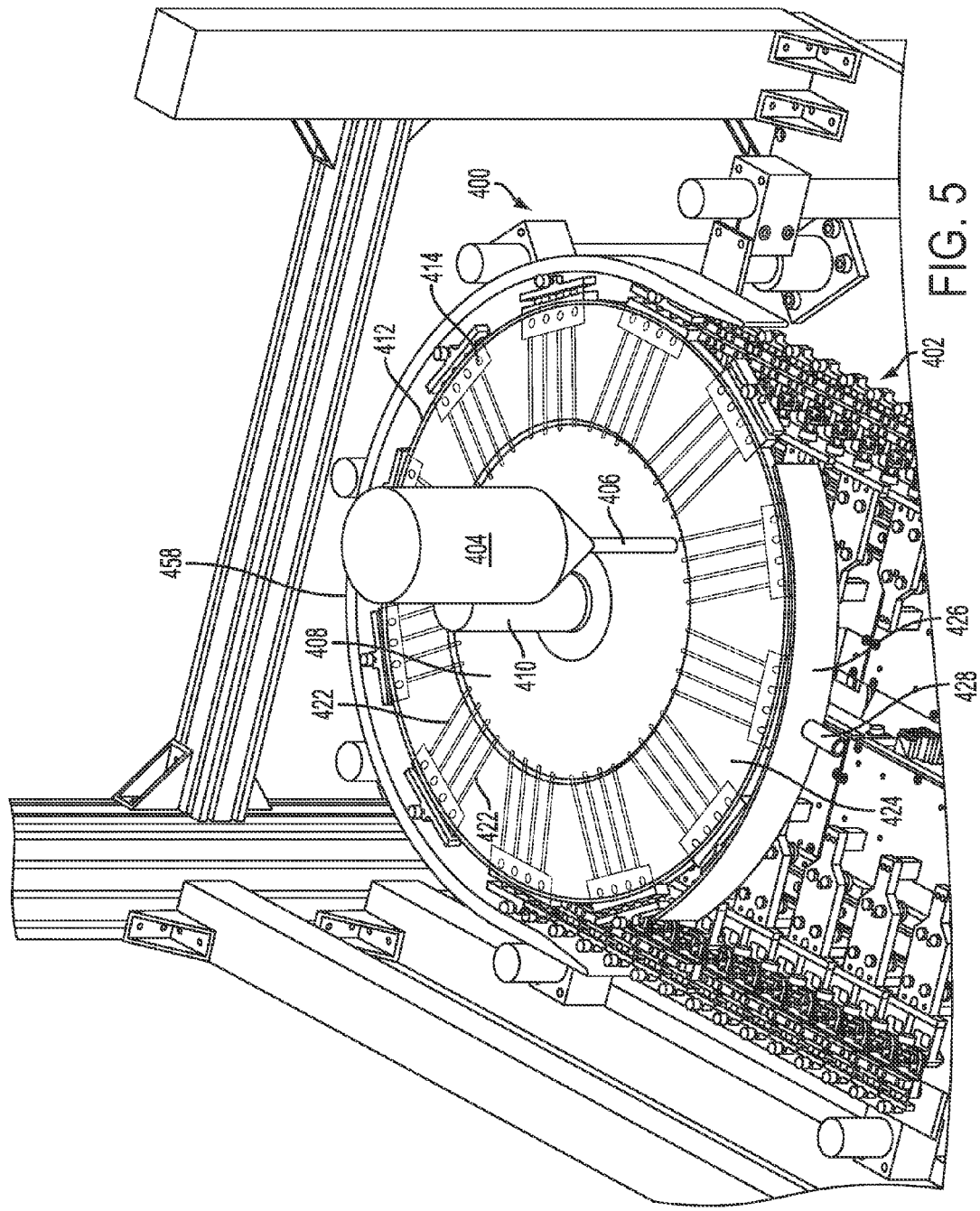
FIG. 5 is a perspective view of another embodiment of a volumetric metering device.
Figure 6:
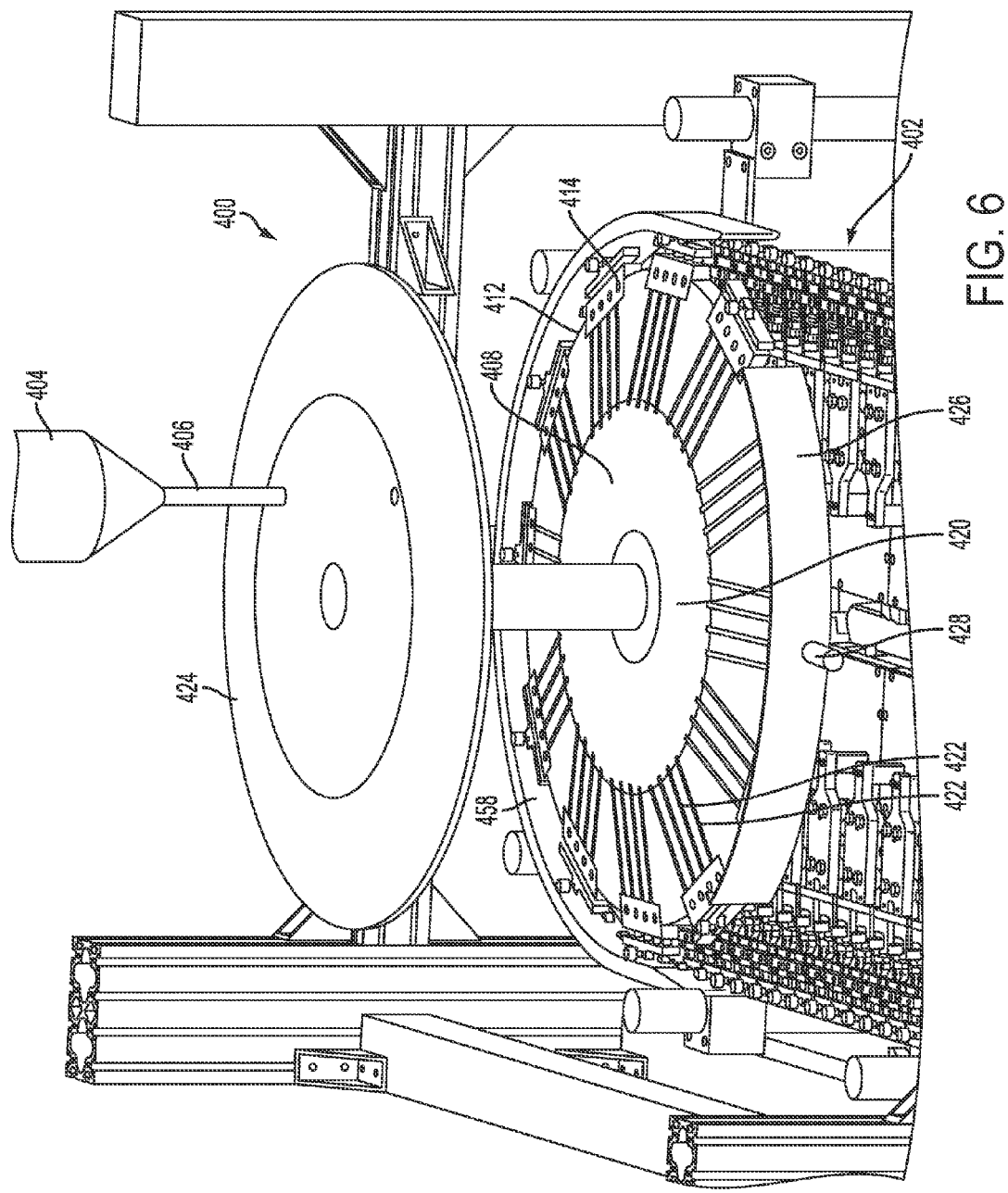
FIG. 6 is a perspective, partially exploded view of the volumetric metering device of FIG. 5.

Referring to FIGS. 5-9, another embodiment of a volumetric metering device is shown. FIGS. 5-6 depict the metering device 400 in combination with a horizontal, track-based dispensing system 402 (further details of which are not provided), however, the metering device 400 is not limited to use with the horizontal dispensing system 402 shown.

Referring to FIGS. 5 and 6, the metering device 400 can include a hopper 404 adapted to hold a supply of granular material, similar to that shown and described in the previous embodiment. The hopper 404 can have an outlet 406 for the granular material. The metering device 400 can also include a rotating metering wheel 408 located, for example, below the outlet 406 of the hopper 404. Accordingly, the hopper 404 can dispense the granular material on to the metering wheel 408. The metering wheel 408 can rotate about drive shaft 410, for example, under direct or indirect power from a servo motor, gearbox, pulley system, or other arrangement.

Figure 7:
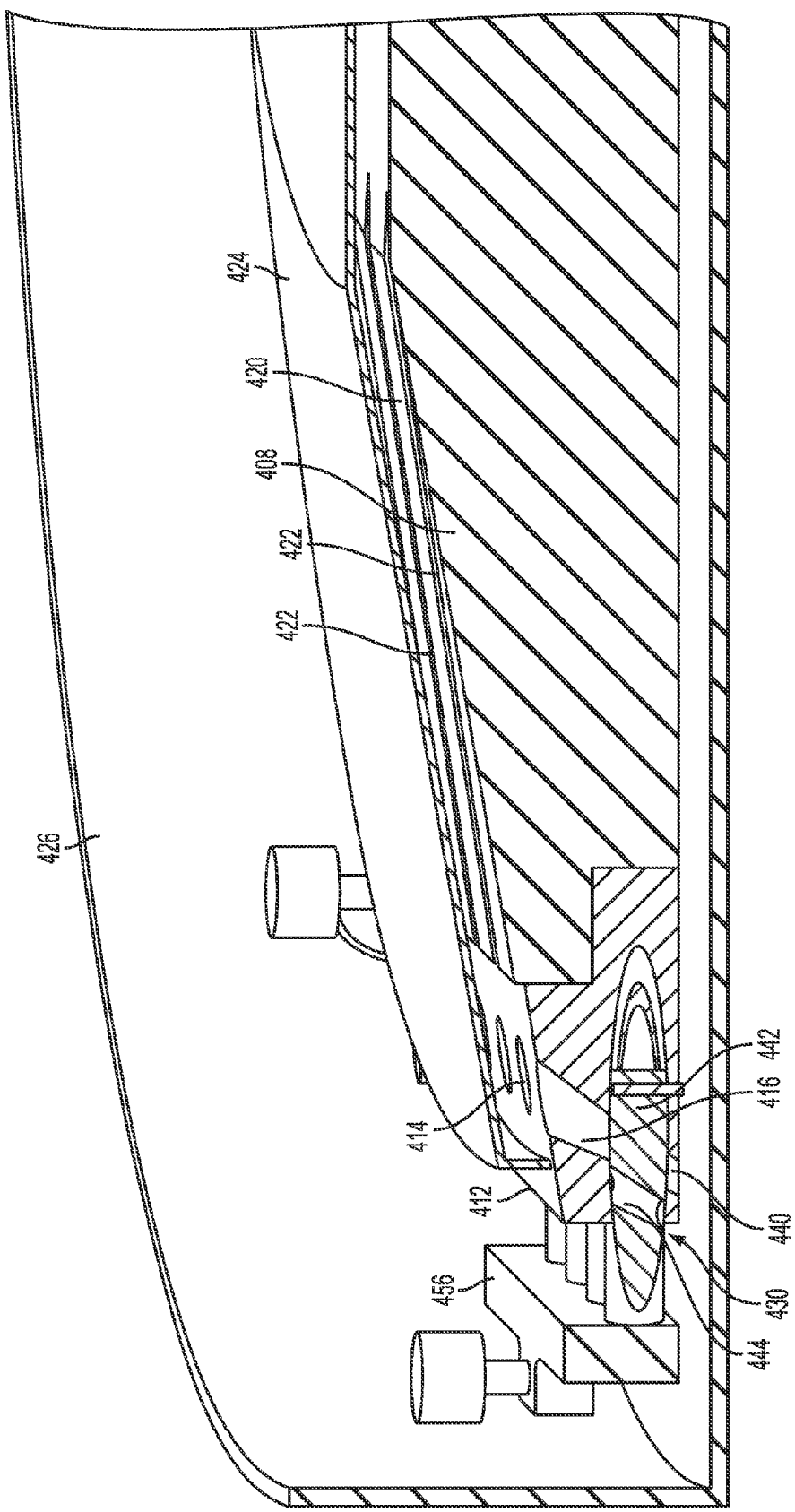
FIG. 7 is a cross-sectional view of a portion of an embodiment of the rotating wheel or platter of FIG. 5.

Still referring to FIGS. 5 and 6, the metering wheel 408 can have an outer periphery 412 including a plurality of metering cavities 414 distributed around the outer periphery 412, e.g., equidistantly. Referring to FIG. 7, each metering cavity 414 can having an open bottom portion 416. The metering wheel 408 can include an upper surface 420 (see FIGS. 6 and 7) that slopes generally from a central region (e.g., near drive shaft 410) toward the outer periphery 412. Accordingly, granulate material deposited on the upper surface 420 by the hopper 404 can travel toward the outer periphery 412 under centrifugal force and/or under the effect of gravity. A plurality of radial grooves 422 can be located in the upper surface 420, and can guide the granular material into a metering cavity 414 connected to the radial groove 422.

Still referring to FIGS. 5 and 6, a cover 424 can be located above the upper surface 420 of the metering wheel 408. FIG. 5 shows the cover 424 in place, and FIG. 6 shows the cover 424 displaced upward to better depict the upper surface 420 of the metering wheel 408. The cover 424 can help retain granular material on the metering wheel 408. The metering device 400 can also include a granulate overfill catch pan 426 located underneath at least a portion of the metering wheel 408. Additionally, the catch pan can extend around the periphery 412 of the metering wheel 408. The catch pan 426 can collect granular material flung off the rotating metering wheel 408, and the collected material can be reintroduced into the system for later use, for example, by placement back in hopper 404. Accordingly, embodiments can include a vacuum source in communication with the catch pan 426, for example, via one or more horizontal ports 428, however, other orientations and configurations of ports are possible.

Figure 8:
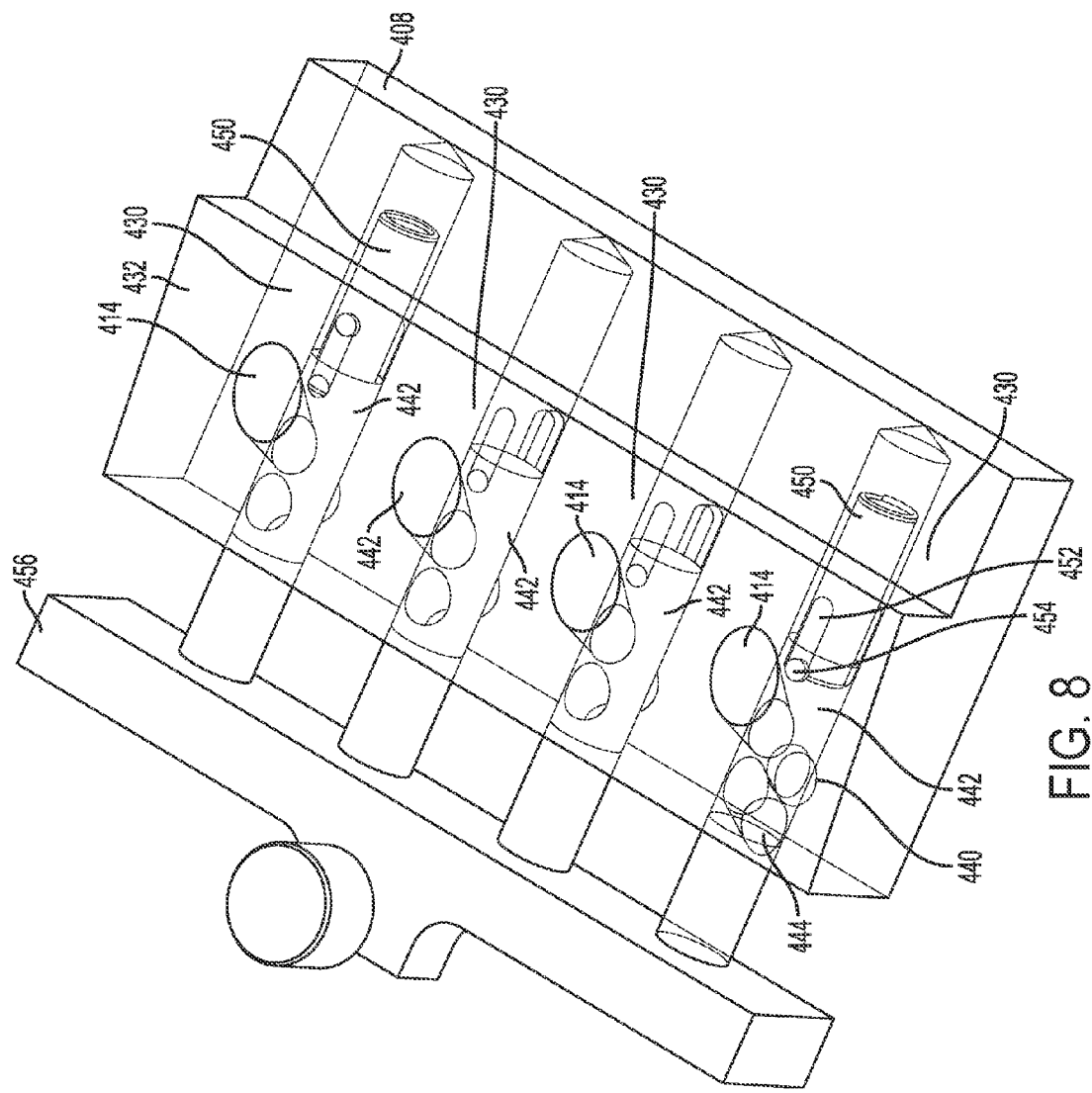
FIG. 8 is a perspective view of an embodiment of a metering valve of FIG. 5, shown in a loading position.
Figure 9:
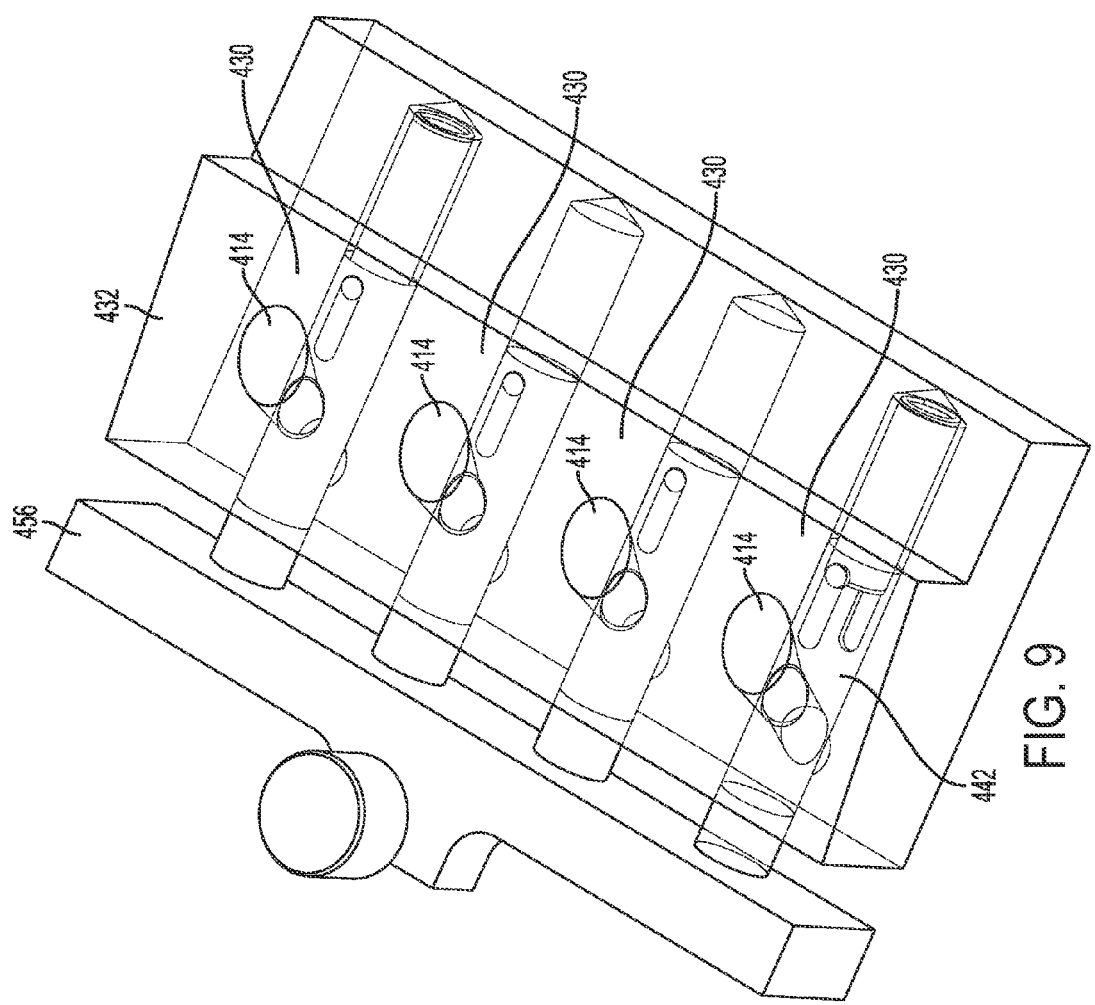
FIG. 9 is a perspective view of the metering valve of FIG. 8, shown in an unloading position.

Referring to FIGS. 7-9, the metering device 400 can include a plurality of metering valves 430 located around the outer periphery 412 of the metering wheel 408. In the embodiment shown in FIGS. 7-9, four metering valves 430 are arranged in a common station 432 (see FIGS. 8 and 9) connected to the metering wheel 408, however, other arrangements are possible. For example, more or fewer valves 430 can be included in each station 432, or each valve 430 can be constructed directly in the metering wheel 408. As shown in FIG. 7, each metering valve 430 can be located in registry with one of the metering cavities 414.

Still referring to FIGS. 7-9, each metering valve 430 is movable between a loading position (FIGS. 7 and 8) in which the metering valve blocks 430 the open bottom portion 416 of the metering cavity 414, and an unloading position (FIG. 9) where the granular material dispenses from the metering cavity 414 through the metering valve 430. When the metering valve 430 is in the loading position, granular material depositing into the metering cavity (e.g., under gravitational and/or centrifugal force) will be retained in the metering cavity 414. Once the metering cavity 414 is full, or substantially full, any overflow will be flung away, e.g., under centrifugal force. Accordingly, the metering cavity 414 can hold a predetermined volume of the granular material. Each metering valve 430 can move substantially radially with respect to the metering wheel 408, e.g., between the loading position and the unloading position. When in the unloading position, the granular material can dispense from the metering cavity 414 through the metering valve 430, and can fall into another tool or item located below the metering valve 430.

Referring specifically to FIG. 7, each metering valve 430 can include a granulate exit port 440 substantially aligned with one of the metering cavities 414. The metering valves 430 can also include a movable valve body 442 including a valve opening 444, e.g., extending through the body 442. The body 442 can move, e.g., radially with respect to the metering wheel 408, between the loading and unloading positions.

When in the loading position, the valve body 442 can block the metering cavity 414 and the granulate exit port 440, thereby preventing granular material from passing from the metering cavity 414 through the metering valve 430. When in the dispensing position, the valve opening 444 can be substantially aligned with the metering cavity 414 and the granulate exit port 440, thereby allowing granulate material in the metering cavity to dispense therefrom through the metering valve 430. Accordingly, pre-metered amounts of the granular material can be dispensed from the metering cavity 414 to another tool or object below the metering wheel 408.

Referring to FIG. 8, the metering valves 430 can be biased toward the loading position, e.g., under elastic force. For example, as shown in FIGS. 8 and 9, elastic elements 450 such as springs, elastomers, Bellville washers, or other known structures can be used to bias the valve bodies 442 into the loading position.

Cooperating valve guide slots 452 and cooperating guide pins 454 can retain the valve bodies 442 in the metering wheel 408 or station 432 and in the proper orientation, however, other arrangements are possible.

Referring to FIGS. 8 and 9, a cam follower 456 can be associated with one or more of the valve bodies 442. With reference to FIGS. 5 and 6, a cam surface 458 can be located around a portion of the periphery of the metering wheel 408. Engagement of the cam surface 458 and the cam followers 456 can cause the metering valves 430 to move from the loading position to the unloading position, thereby causing granular material to dispense from the respective metering cavities. Referring back to FIGS. 8 and 9, the cam followers 456 can be roller cams, however, other variations are possible. Additionally, the orientation of the cam follower and cam surface can be reversed from what is shown. The position and extent of the cam surface 458 can be configured to selectively time movement of the metering valves 430 from the loading position to the unloading position, and vice versa, in order to coordinate filling and dispensing of objects from the metering cavities 414 with other machines or objects.

According to another aspect of the metering wheels shown in FIGS. 1-4 as well as FIGS. 5-9, the metering cavities can be configured to orient one or more objects in a preselected orientation. For example, the objects, such as a single solid object, and the metering cavities, can have corresponding geometries that cause the object to self-orient itself in the preselected orientation with respect to the metering wheel. Accordingly, in such embodiments, the object can be dispensed through the metering wheel into a tool or other object therebelow in the desired orientation. Although this is explained in connection with a single object, multiple objects having a combined shape that corresponds to a metering cavity can likewise be oriented for dispensing in a preselected orientation.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

The invention claimed is:

1. A volumetric metering device, comprising:
   a hopper adapted to hold a supply of granular material, the hopper having an outlet;
   a rotating wheel located in communication with the outlet, the rotating wheel having an outer periphery and a plurality of metering cavities distributed around the outer periphery, each metering cavity having an open bottom portion; and
   a plurality of metering valves located around the outer periphery of the rotating wheel with each metering valve located in registry with one of the metering cavities;
   wherein each metering valve comprises:
      a valve body defining a valve opening, the valve body pivotable between a loading position wherein the valve body blocks the open bottom portion of the metering cavity, and an unloading position wherein the valve opening is substantially aligned with the open bottom portion of the metering cavity to dispense granular material from the metering cavity through the metering valve; and
      a flute extending from the valve body, the flute defining a channel in registry with the valve opening, the channel having a laterally open portion adapted to receive and support a hollow cylindrical object.

2. The metering device of claim 1, wherein the rotating wheel includes an upper surface that slopes from a central region toward the outer periphery.

3. The metering device of claim 2, further comprising a cover located above the upper surface of the rotating wheel, wherein the hopper is coupled to the cover.

4. The metering device of claim 2, further comprising a plurality of radial grooves located in the upper surface of the rotating wheel, each radial groove connecting to one of the metering cavities.

5. The metering device of claim 1, wherein at least some of the metering valves are elastically biased toward the loading position.

6. The metering device of claim 1, further comprising a granulate overfill catch pan located underneath at least a portion of the metering wheel.

7. The metering device of claim 6, further comprising a vacuum source located in communication with the granulate overfill catch pan.

8. The metering device of claim 1, further comprising a cam mechanism that pivots the valve body between the loading position and the unloading position.

9. The metering device of claim 1, further comprising vacuum holes located in the flute, the vacuum holes in communication with a vacuum source.

10. The metering device of claim 1, wherein the granular material comprises at least one of pellets of compressed tobacco, flavor capsules, and flavor impregnated granulates.

11. A method for metering a predetermined volume of granular material, the method comprising:
   (a) unloading granular material from a hopper onto a rotating wheel;
   (b) distributing the granular material into a metering cavity located at a periphery of the rotating wheel, the metering cavity having an open bottom portion;
   (c) inserting a hollow cylindrical object laterally into an open portion of a channel located on a flute extending from a valve body of a metering valve located in registry with the metering cavity; and
   (d) pivoting the metering valve from a loading position where a valve body of the metering valve blocks the open bottom portion of the metering cavity, to an unloading position where the granular material dispenses from the metering cavity through a valve opening in the valve body.

12. The method of claim 11, further comprising:
   removing granular material extending above an open top portion of the metering cavity.

13. The method of claim 11, wherein the granular material comprises at least one of pellets of compressed tobacco, flavor capsules, and flavor impregnated granulates.

* * * * *